United States Patent
Ehara

(10) Patent No.: US 11,513,262 B2
(45) Date of Patent: Nov. 29, 2022

(54) METHOD FOR MANUFACTURING STRUCTURE

(71) Applicant: KONICA MINOLTA, INC., Tokyo (JP)

(72) Inventor: Yoshinobu Ehara, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/969,613

(22) PCT Filed: Mar. 8, 2019

(86) PCT No.: PCT/JP2019/009290
§ 371 (c)(1),
(2) Date: Aug. 13, 2020

(87) PCT Pub. No.: WO2019/172411
PCT Pub. Date: Sep. 12, 2019

(65) Prior Publication Data
US 2021/0026041 A1 Jan. 28, 2021

(30) Foreign Application Priority Data
Mar. 9, 2018 (JP) .............................. JP2018-043361

(51) Int. Cl.
*G02B 3/00* (2006.01)
*B29D 11/00* (2006.01)
(Continued)

(52) U.S. Cl.
CPC ............ *G02B 3/0012* (2013.01); *B29C 65/70* (2013.01); *B29C 66/8141* (2013.01);
(Continued)

(58) Field of Classification Search
CPC ............ B29C 66/91945; B29C 66/034; B29C 66/0344; B29C 66/73117; B29C 66/8141;
(Continued)

(56) References Cited

U.S. PATENT DOCUMENTS 9,150,411 B2  10/2015  Okawa et al.
10,449,723 B2  10/2019  Patberg et al.
(Continued)

FOREIGN PATENT DOCUMENTS

CN  1537047 A  10/2004
CN  1951676 A  4/2007
(Continued)

OTHER PUBLICATIONS

"Deflection Temperature Testing of Plastics" from matweb.com as captured by archive.org Nov. 2007.*
(Continued)

*Primary Examiner* — John L Goff, II
(74) *Attorney, Agent, or Firm* — Buchanan Ingersoll & Rooney PC

(57) ABSTRACT

A method is for manufacturing a structure obtained by stacking a substrate that is a first member as a base material, and lens arrays that are second members that are opposed to the substrate, are formed of a resin material different from the substrate, and have a shape on a surface. The method includes a surface activation step of performing an activation treatment to cause an activation state of at least one of a surface of the substrate or a surface of the lens arrays, and a bonding step of pressurizing the lens arrays at least at a temperature that is equal to or higher than a reference temperature obtained by subtracting 30° C. from a load deflection temperature of a resin material of the lens arrays, and is equal to or lower than a glass transition temperature, to closely bond to the substrate.

14 Claims, 10 Drawing Sheets

(51) Int. Cl.

| | |
|---|---|
| *B32B 37/04* | (2006.01) |
| *B29C 65/70* | (2006.01) |
| *B29C 65/00* | (2006.01) |
| *B32B 37/06* | (2006.01) |
| *B32B 37/10* | (2006.01) |
| *B32B 37/18* | (2006.01) |
| *B32B 37/12* | (2006.01) |
| *B29K 23/00* | (2006.01) |
| *B29K 709/08* | (2006.01) |

(52) U.S. Cl.
CPC .. *B29C 66/91941* (2013.01); *B29D 11/00413* (2013.01); *B32B 37/04* (2013.01); *B32B 37/06* (2013.01); *B32B 37/10* (2013.01); *B32B 37/12* (2013.01); *B32B 37/182* (2013.01); *G02B 3/0068* (2013.01); *B29K 2023/38* (2013.01); *B29K 2709/08* (2013.01); *B32B 2250/03* (2013.01); *B32B 2250/40* (2013.01); *B32B 2305/72* (2013.01); *B32B 2309/02* (2013.01); *B32B 2309/12* (2013.01); *B32B 2310/00* (2013.01); *B32B 2551/00* (2013.01)

(58) Field of Classification Search
CPC ..... B29C 66/74; B29C 66/9141; B29C 65/70; B29C 65/44; B29C 65/64; B29C 65/7855; B29C 66/91941; B29C 66/91943; G02B 3/0012; G02B 3/0068; G02B 3/0031; G02B 3/0056; B32B 37/04; B32B 37/06; B32B 37/10; B32B 37/12; B32B 37/182; B32B 37/185; B32B 38/0036; B32B 2038/0048; B32B 41/00; B32B 2309/02; B32B 2309/12; B32B 2305/72; B32B 2310/00; B29D 11/00413; B29D 11/0073; B29D 11/00403; B29K 2709/08; B29K 2023/38

See application file for complete search history.

(56) References Cited

U.S. PATENT DOCUMENTS

| | | | | |
|---|---|---|---|---|
| 2009/0136691 | A1* | 5/2009 | Suzuki | B44C 1/105 428/31 |
| 2009/0250163 | A1* | 10/2009 | Kashiwagi | B29C 66/1122 156/272.6 |
| 2010/0200144 | A1 | 8/2010 | Matsuo | |

FOREIGN PATENT DOCUMENTS

| | | |
|---|---|---|
| JP | 2006339363 A | 12/2006 |
| JP | 2007237299 A | 9/2007 |
| JP | 2010184499 A | 8/2010 |
| JP | 2013099867 A | 5/2013 |
| JP | 2013103456 A | 5/2013 |
| JP | 2016528074 A | 9/2016 |
| WO | 2007119552 A | 10/2007 |

OTHER PUBLICATIONS

"#106 Glass Transition Temperature Tg of Plastics" misumi-techcentral.com Dec. 2011.*

"Review of Surface Characterisation Techniques for Adhesive Bonding" Broughton et al. Feb. 2002.*

International Search Report and Written Opinion of the International Searching Authority (Forms PCT/ISA/237 and PCT/ISA/210) dated Jun. 11, 2019, by the Japanese Patent Office in corresponding International Application No. PCT/JP2019/009290, with an English Translation. (14 pages).

First Office Action dated Sep. 8, 2021, by the Chinese Patent Office in corresponding Chinese Patent Application No. 201980017680.9, and an English Translation of the Office Action. (12 pages).

Notice of Reasons for Refusal issued in corresponding Japanese Patent Application No. 2020-505128, dated May 11, 2022, with English Translation (8 pages).

Second Office Action issued in corresponding Chinese Patent Application No. 201980017680.9, dated Feb. 15, 2022 (13 pages).

The Decision of Final Rejection of the Application issued in corresponding Chinese Patent Application No. 201980017680.9, dated May 30, 2022, with English Translation (8 pages).

* cited by examiner

METHOD FOR MANUFACTURING STRUCTURE

TECHNICAL FIELD

The present invention relates to a method for manufacturing a structure in which a plurality of members are bonded.

BACKGROUND ART

When producing a device having a relatively long shape that requires high dimensional accuracy, an influence of linear expansion due to environmental temperature is a serious problem. On the other hand, it is conceivable to produce the device as described above by processing a material having a low linear expansion coefficient, but it is difficult to achieve all of low cost, high function, and high productivity. As a method for solving this, there is a method of suppressing the influence of linear expansion by bonding a material having a low linear expansion coefficient and a resin material having excellent workability. As such a method of bonding different members, there is a method described in Patent Literature 1, for example.

In the method of Patent Literature 1, highly accurate bonding is performed by forming a film of a plasma polymer (organic substance) on one of members to be bonded, and pressurizing and heating after hydrophilizing both surfaces of the members to be bonded. However, in the method of Patent Literature 1, in order to bring the two members into close contact, it is necessary to take measures such as performing mirror finishing on a surface activated by forming the film of the plasma polymer, increasing a thickness of the plasma polymerization film to about 10 nm to 10 μm, making one member with a soft material, or the like. Mirror finishing a surface of the member increases the cost. Further, when a thickness of the plasma polymerization film is increased or the member is made with a soft material, it is difficult to suppress the influence of linear expansion because following to the one member is relaxed.

Note that, as another method of bonding two members, there is a method for assembling component in which a DNA single-chain structure is carried on a surface of a base material and a surface of a component, to bond between both members based on hydrogen bonding (for example, see Patent Literature 2). However, since the method of Patent Literature 2 is bonding through hydrogen bonding alone, the bonding may be weakened by moisture or the like, and firm bonding is difficult.

Further, as another method for bonding two members, there is a bonding method of bonding surfaces of objects to be bonded, hydrophilizing the surfaces of the objects to be bonded by changing intensity of a chemical treatment between the first half of a plasma treatment and the second half of the plasma treatment, and performing hydrogen bonding of the surfaces of the objects to be bonded and then annealing at normal temperature to about 200° C. (for example, see Patent Literature 3). However, in the method of Patent Literature 3, it is premised on bonding between wafers formed of a material with high surface accuracy and high hardness. Therefore, although it is possible to temporarily bond with a certain bonding force by hydrogen bonding even without pressurization, the bonding at the time of temporary bonding becomes weak if the surface accuracy is poor, and there is a possibility that a positional deviation will occur before annealing.

CITATION LIST

Patent Literature

Patent Literature 1: JP 2010-184499 A
Patent Literature 2: JP 2007-237299 A
Patent Literature 3: JP 2006-339363 A

SUMMARY OF INVENTION

An object of the present invention is to provide a method for manufacturing a stacked structure with low cost, high function, and high productivity while suppressing an influence of linear expansion.

In order to achieve at least one object described above, a method for manufacturing a structure reflecting one aspect of the present invention is a method for manufacturing a structure obtained by stacking a first member as a base material, and a second member that is opposed to the first member, is formed of a resin material different from the first member, and has a shape on a surface. The method includes: a surface activation step of performing an activation treatment to cause an activation state of at least one of a surface of the first member or a surface of the second member; and a bonding step of pressurizing the second member at least at a temperature that is equal to or higher than a reference temperature obtained by subtracting 30° C. from a load deflection temperature of a resin material of the second member, and is equal to or lower than a glass transition temperature, to closely bond to the first member. Here, the surface shape of the second member may be a planar shape or a three-dimensional shape.

DESCRIPTION OF EMBODIMENTS

First Embodiment

Figure 1A:
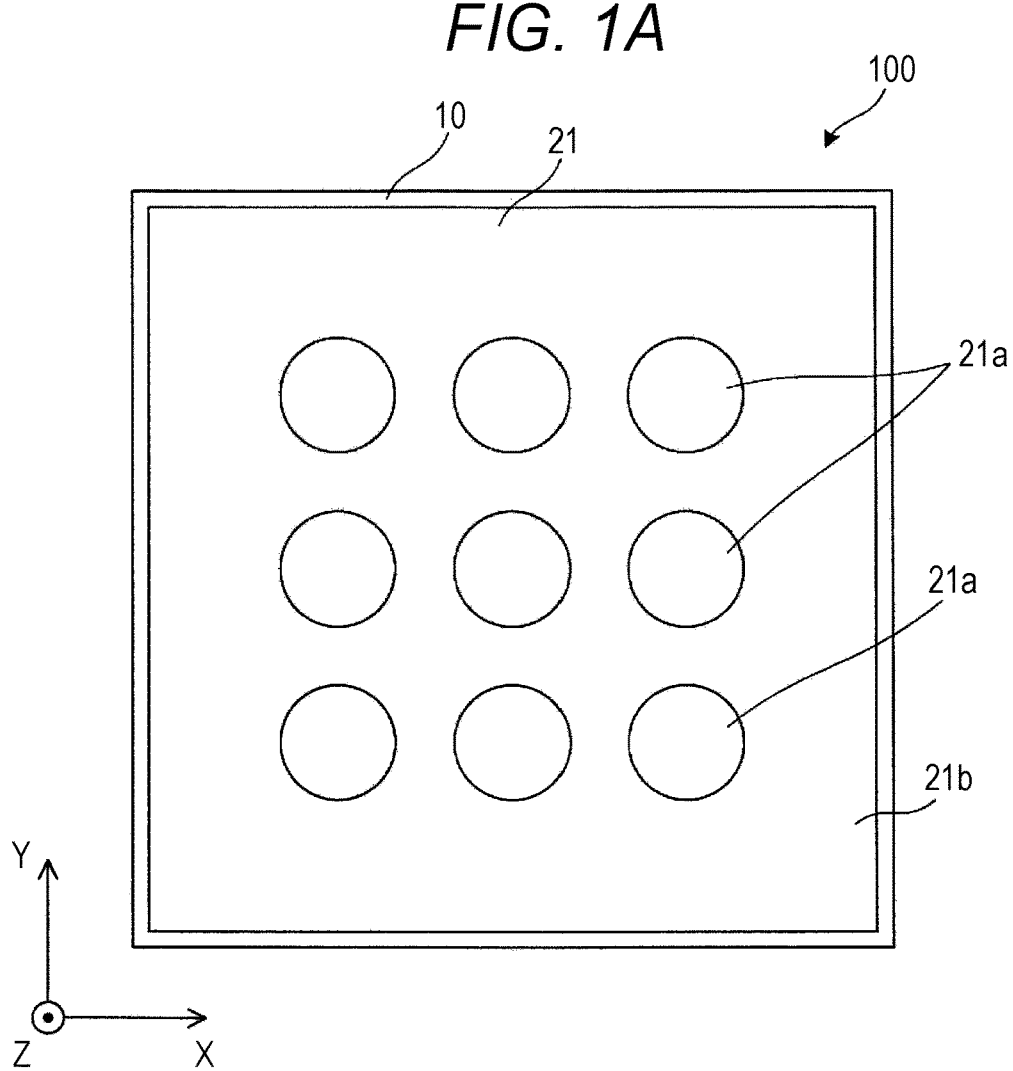
FIG. 1A is a plan view of a structure produced by a method for manufacturing a structure of a first embodiment.
Figure 1B:
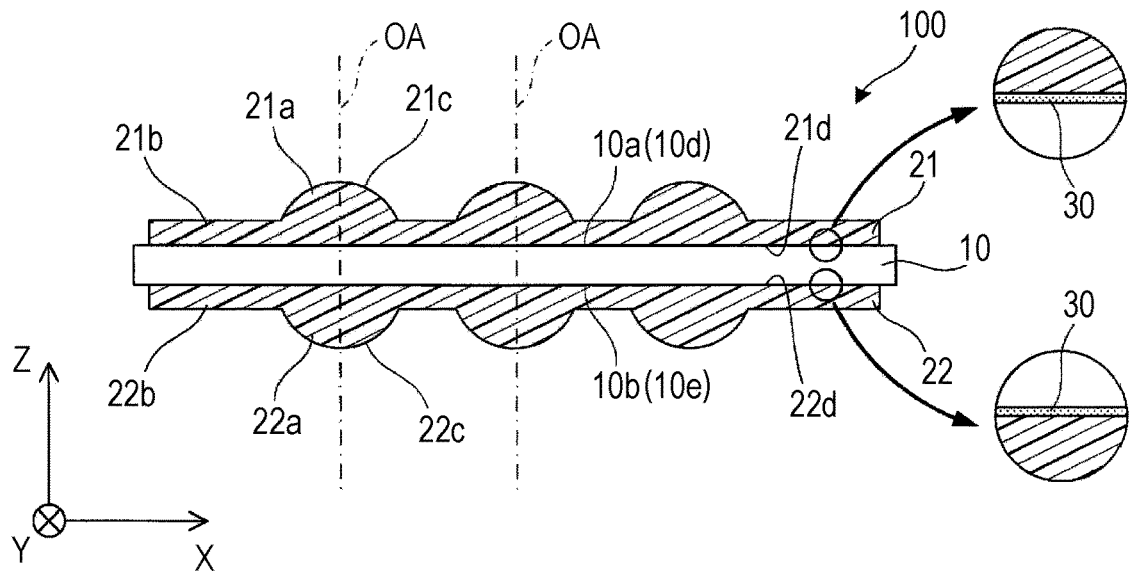
FIG. 1B is a side cross-sectional view of the structure shown in FIG. 1A.

Hereinafter, a structure manufactured by a method for manufacturing a structure according to a first embodiment of the present invention will be described with reference to the drawings. As shown in FIGS. 1A and 1B, a structure 100 includes a substrate 10 that is a first member as a base material, a first lens array 21 that is a second member, and a second lens array 22 that is a second member. The substrate 10, the first lens array 21, and the second lens array 22 are stacked and bonded in a Z-axis direction perpendicular to an XY plane in which the substrate 10 extends. Further, the first and second lens arrays 21 and 22 are arranged so as to be opposed to each other with the substrate 10 in between. That is, the structure 100 is a stacked structure in which the lens arrays are provided on both surfaces of the substrate 10, and the both surfaces of the substrate 10 have a three-dimensional shape. The structure 100 has a rectangular outline when viewed from an optical axis OA direction. As will be described later in detail, the structure 100 can be used as, for example, a light source unit (see FIG. 5B and the like).

The first and second lens arrays 21 and 22 are members having light transmissivity that can transmit light in a wavelength range to be used, and are, for example, transparent members when transmitting light having a wavelength in a visible light region. The first and second lens arrays 21 and 22 are made of a resin material. As the resin material, for example, a thermoplastic resin is used. As the thermoplastic resin, for example, cycloolefin polymer (COP), cycloolefin copolymer (COC), acrylic (PMMA), polycarbonate (PC), and the like are used. By using the thermoplastic resin as the resin material, it is possible to facilitate surface activation of the first and second lens arrays 21 and 22 by a plasma treatment. In addition, the three-dimensional shapes of the first and second lens arrays 21 and 22 can be easily transferred by a shaping method such as hot pressing.

The first lens array 21 has a plurality of first lens elements 21*a* and a first support part 21*b* that supports the first lens elements 21*a* from peripheries. The first lens element 21*a* is, for example, a convex aspherical lens and has a first optical surface 21*c*. The first lens elements 21*a* are two-dimensionally arranged on the substrate 10. The second lens array 22 has a plurality of second lens elements 22*a* and a second support part 22*b* that supports the second lens elements 21*a* from peripheries. The second lens element 21*a* is, for example, a convex aspherical lens and has a second optical surface 22*c*. The second lens elements 22*a* are two-dimensionally arranged on the substrate 10. The first lens element 21*a* and the second lens element 22*a* are paired, and the optical axes OA of the first and second lens elements 21*a* and 22*a* opposed to each other are aligned. As will be described later in detail, the first and second lens arrays 21 and 22 and the substrate 10 are firmly bonded by temporarily fixing during positioning in a bonding step and then fully fixing in a heating step. The first lens array 21 is used, for example, as a condenser lens together with the second lens array 22. Note that an example in which 3×3 lens elements are arranged is given in the drawing, but the number of lens elements can be appropriately changed in accordance with an application.

The substrate 10 is, for example, a plate-shaped member having light transmissivity in a visible range, and is a glass substrate formed of glass that is an inorganic material. Since the inorganic material has a relatively small linear expansion, it is possible to further suppress a change in the three-dimensional shape due to linear expansion, on the first and second lens arrays 21 and 22. Further, even a material such as glass that is difficult to process can be handled with a simple shape such as a cylinder or a flat plate. As the inorganic material, in addition to glass, a ceramic material, a metal, or the like can be used.

The first lens array 21 is bonded to a first surface 10*a*, which is one surface of the substrate 10. The second lens array 22 is bonded to a second surface 10*b*, which is another surface of the substrate 10.

Between a first bonding surface 21*d* of the first lens array 21 facing the substrate 10 and a second bonding surface 10*d* of the substrate 10 facing the first lens array 21, an adhesive layer 30 having a silane coupling agent (or a silanol-containing adhesive) is provided. Between a first bonding surface 22*d* of the second lens array 22 facing the substrate 10 and a second bonding surface 10*e* of the substrate 10 facing the second lens array 22, the adhesive layer 30 having a silane coupling agent (or a silanol-containing adhesive) is provided. By providing the adhesive layer 30, even a material whose surface is difficult to be activated can be easily activated. Note that the adhesive layer 30 is a thin layer having a thickness of 0.1 nm to 1 µm, or preferably 0.1 nm to 10 nm, and does not adversely affect direct bonding between the first and second lens arrays 21 and 22 and the substrate 10.

Before bonding of the structure 100, surface roughness of at least one bonding surface of the first bonding surfaces 21*d* and 22*d* or the second bonding surfaces 10*d* and 10*e* is larger than 1 nm.

Hereinafter, a method for manufacturing the structure 100 will be described with reference to FIGS. 2A to 2D, FIGS. 3A and 3B, and FIG. 4. In manufacturing of the structure 100, a surface activation step, a bonding step, a transfer step, and a heating step are performed. In the present embodiment, the heating step and the transfer step are performed simultaneously. Here, "simultaneously with the heating step" also includes a case of performing the heating step and the transfer step while changing a temperature.

[Preparation of First and Second Members]

Figure 4:
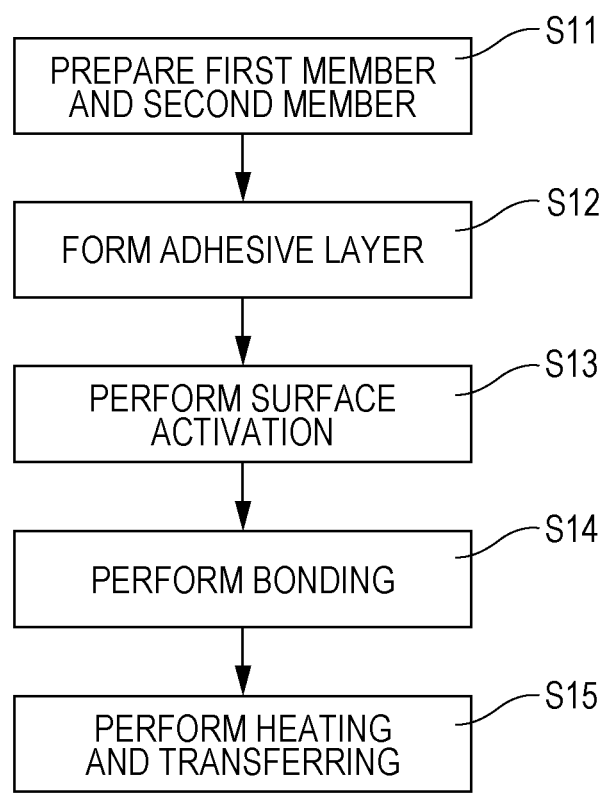
FIG. 4 is a flowchart for explaining the method for manufacturing the structure of the first embodiment.

First, the substrate 10 that is the first member, and a lens member 20 serving as a base material of the first and second lens arrays 21 and 22 that are the second members are prepared (step S11 in FIG. 4). The lens member 20 is a plate-shaped member on which a desired three-dimensional shape is not formed (see FIG. 2B).

[Formation of Adhesive Layer]

Figure 2A:
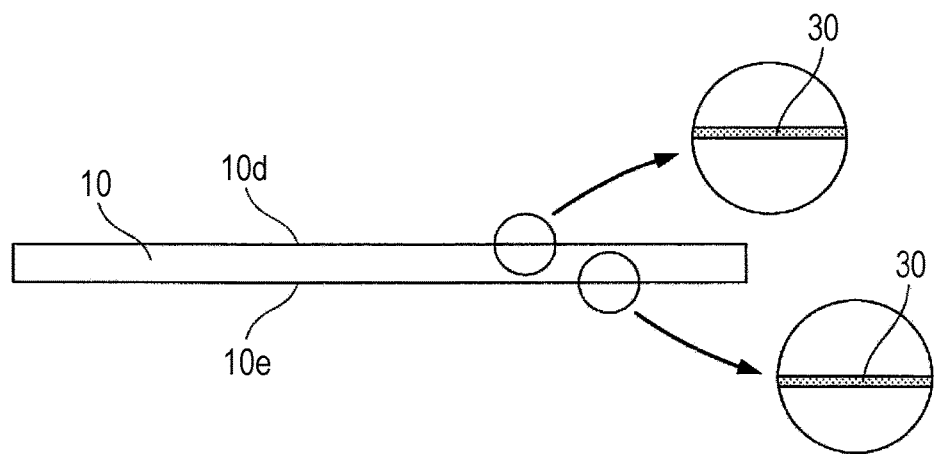
FIGS. 2A to 2D are views for explaining the method for manufacturing the structure of the first embodiment.

As shown in FIG. 2A, the adhesive layer 30 having a silane coupling agent (or a silanol-containing adhesive) is provided on the second bonding surfaces 10*d* and 10*e* of the substrate 10 (step S12 in FIG. 4). This allows a bonding method described later to be also applied to a ceramic material such as glass, such as the substrate 10, in which hydrogen bonding is unlikely to occur.

[Surface Activation]

Figure 2B:
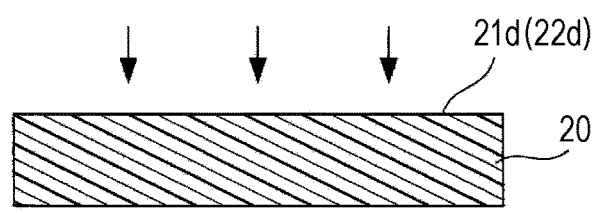
Figure 2C:
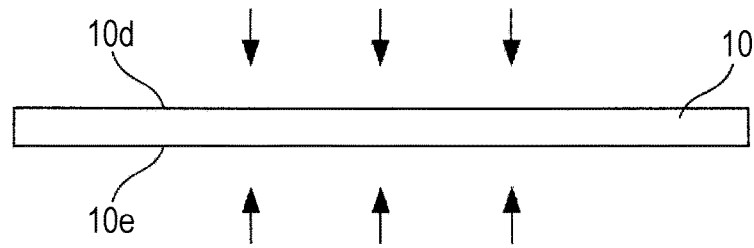

As shown in FIGS. 2B and 2C, an activation treatment is performed to cause an activation state on at least any of the first and second bonding surfaces 21*d*, 22*d*, 10*d*, and 10*e* (when the adhesive layer 30 is provided, the surface thereof) (step S13 in FIG. 4). The activation state means, for example, in addition to a state where a methyl group or a phenyl group of the resin is cleaved, a state where polar groups such as OH groups (hydroxyl groups) and CHO groups (aldehyde groups) are connected to the dangling bonds and elements on the material surface of the member. As the activation treatment, specifically, a corona treatment, a plasma treatment, an ozone treatment, an ultraviolet (UV) treatment, or the like is performed, and energy is applied to the material to cause the activation state. As shown in FIGS. 2B and 2C, the activation treatment is applied partially or entirely to the second bonding surfaces 10*d* and 10*e* of the substrate 10 and the first bonding surfaces 21d and 22d of the lens member 20. This individually causes activation of the first bonding surfaces 21d and 22d of the lens member 20 and the second bonding surfaces 10d and 10e of the substrate 10. The activation treatment can be preferably performed in an atmosphere at normal temperature. Here, the normal temperature means 20° C.±15° C.

By forming the lens member 20 with a resin material, the resin material can easily exhibit hydrogen bonding by the plasma treatment or the like, and can maintain the bonding. The hydrogen bonding is weak bonding in which polar groups as represented by OH groups attract each other.

[Bonding]

Next, a bonding step is performed in which the first and second bonding surfaces 21d, 22d, 10d, and 10e are pressurized while being put together, and the lens member 20 and the substrate 10 are positioned and temporarily fixed by hydrogen bonding (step S14 in FIG. 4). An environmental temperature of the bonding step is a temperature that does not interfere with the surface activation state, that is, a temperature that is equal to or higher than a reference temperature obtained by subtracting 30° C. from a load deflection temperature of the resin material of the lens member 20 that is the second member, and is equal to or lower than a glass transition temperature (for example, 90° C. or higher and 140° C. or lower). Here, the load deflection temperature is a temperature at which the material begins to deform under a certain pressure wherein the pressure at which the load deflection temperature is determined corresponds to the application pressure during the pressurizing. Further, in a case of using a general COP material, the glass transition temperature may be 120 to 160° C. In the bonding step, by pressurizing at this temperature, the lens member 20 that is the second member is closely bonded to the substrate 10 that is the first member. This enables temporary fixing without causing dehydration condensation during positioning. Note that, in the bonding step, it is desirable to set time during which dehydration condensation does not occur at a time of the work.

Specifically, first, the first bonding surface 21d on the lens member 20 side forming the first lens array 21 is made opposed to the second bonding surface 10d on the substrate 10 side, and the lens member 20 and the substrate 10 are placed at a bonding position with a gap in between, while maintaining an activated state of the surfaces of the first and second bonding surfaces 21d and 10d. Further, the first bonding surface 22d on the lens member 20 side forming the second lens array 22 is made opposed to the second bonding surface 10e on the substrate 10 side, and the lens member 20 and the substrate 10 are placed at a bonding position with a gap in between, while maintaining an activated state of the surfaces of the first and second bonding surfaces 22d and 10e. Although not shown, a distance between the lens member 20 and the substrate 10 at a time of positioning is preferably 100 nm or more. Further, in the positioning, either the lens member 20 or the substrate 10 may be moved, or both may be moved relatively. For example, positioning marks are provided on the lens member 20 and the substrate 10, and the positioning is performed by aligning the mark positions. Further, by providing the lens member 20 and the substrate 10 with an abutting portion that serves as a positioning reference, the positioning can also be made by abutting the abutting portion.

Figure 2D:
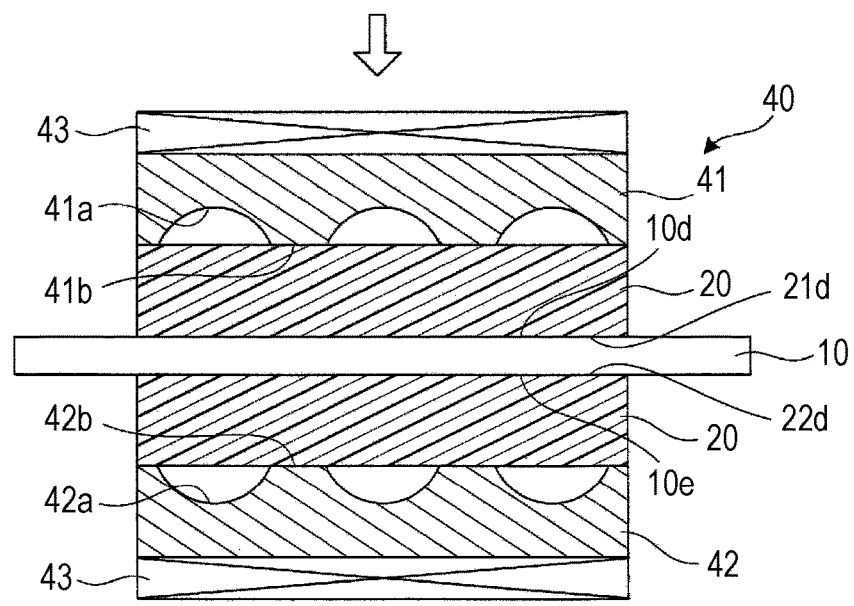

As shown in FIG. 2D, after the positioning, the lens member 20 forming the first lens array 21 and the substrate 10 are abutted and bonded to each other, with the first and second bonding surfaces 21d and 10d being activated. Further, the lens member 20 forming the second lens array 22 and the substrate 10 are abutted and bonded to each other, with the first and second bonding surfaces 22d and 10e being activated. Note that, at a time of the abutting, the first and second bonding surfaces 21d, 22d, 10d, and 10e are brought into close contact with each other by pressurizing with a predetermined pressure or more. In the present embodiment, since the transfer step and the heating step are continuously performed following the target bonding step, the lens member 20 is pressed using a mold 40.

Regarding the pressurization during bonding, it is desirable to change the pressure in accordance with elastic moduli of the materials of the lens member 20 and the substrate 10. The pressure of the pressurization is, for example, 10 MPa or less, and preferably 0.005 MPa or more and 10 MPa or less. An optimum value of the pressure for pressurizing the material used varies within the above range depending on the material and the temperature, and the pressure may be lower as the material is softer. This enables bonding of the substrate 10 and the lens member 20 that is the second member, without breaking the substrate 10 that is the first member.

In the bonding step described above, it is necessary to bring surfaces of objects to be bonded into contact with each other while at least the surface of the resin lens member 20 is activated. When the temperature exceeds an upper limit (for example, 140° C.) before the contact between the substrate 10 and the lens member 20, the activation state of the surface changes (deactivation state) due to physical properties of the resin of the lens member 20. This disables the contact in the activation state, which is a necessary condition for bonding between the substrate 10 and the lens member 20, and thus the bonding cannot be performed.

Note that this bonding state is a state where the lens member 20 and the substrate 10 are temporarily fixed by hydrogen bonding. In this temporary fixing, the lens member 20 and the substrate 10 are temporarily fixed at a predetermined site, and in a state of being freely removed by immersing in water or the like.

[Heating and Transfer]

Figure 3A:
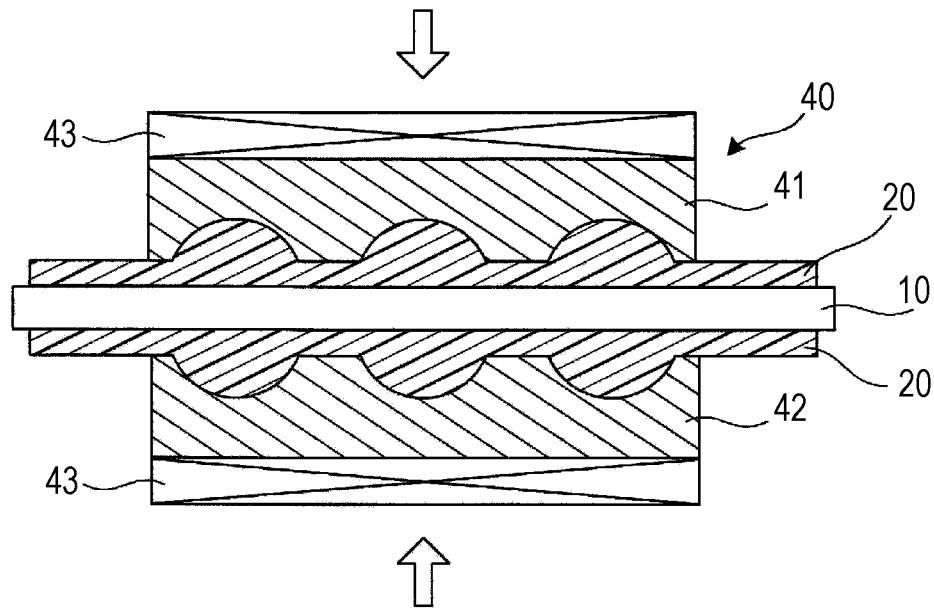
FIGS. 3A and 3B are views for explaining the method for manufacturing the structure of the first embodiment.
Figure 3B:
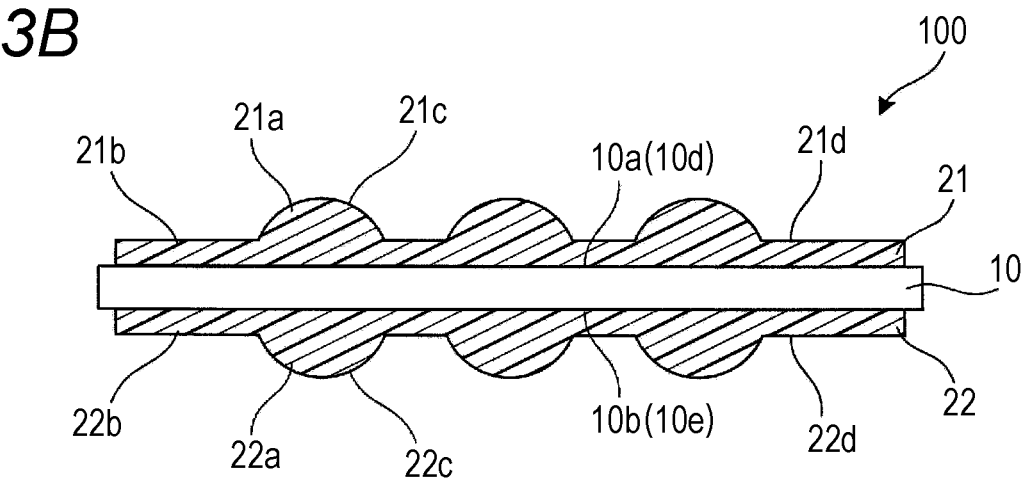

As shown in FIGS. 2D and 3A, the lens member 20 is shaped using the mold 40. The mold 40 is arranged outside the lens member 20. The mold 40 has a first mold 41 that shapes the first lens array 21, and a second mold 42 that shapes the second lens array 22. The first mold 41 has a first lens transfer surface 41a that transfers the first lens element 21a of the first lens array 21, and a first support transfer part 41b that transfers the first support part 21b. The second mold 42 has a second lens transfer surface 42a that transfers the second lens element 22a of the second lens array 22, and a second support transfer part 42b that transfers the second support part 22b. A heater 43 is individually provided in association with the first and second molds 41 and 42. In the molds 41 and 42 in the bonding step, the heater 43 maintains the above-described temperature range from equal to or higher than the reference temperature obtained by subtracting 30° C. from the load deflection temperature of the resin material of the lens member 20, to equal to or lower than the glass transition temperature. Further, in the transfer step, the heater 43 maintains the same temperature as that in the heating step, that is, a temperature higher than the glass transition temperature, specifically 170° C. or higher.

As shown in FIG. 3A, simultaneously with the heating step, the transfer step of transferring a three-dimensional shape to the lens member 20 that is the second member is performed (step S15 in FIG. 4). Specifically, the lens member 20 and the substrate 10 are bonded with a predetermined pressurization under the temperature environment of the bonding step, and, continuously, the three-dimensional shape is transferred to the lens member 20 by predetermined pressurization under a temperature environment of the transfer step in which the temperature at the time of bonding is raised. An application pressure in the transfer step is set in relation between a temperature at the time of pressurization and shaping accuracy of the second member. Note that the application pressure may be due to a weight of the lens member 20 depending on a shape of the second member. By such a transfer step, the three-dimensional shape of the lens member 20 can be kept in a state at the time of shaping. Specifically, the three-dimensional shape of the first lens element 21a and the three-dimensional shape of the first support part 21b of the first lens array 21 are transferred to the upper lens member 20, and the three-dimensional shape of the second lens element 22a and the three-dimensional shape of the second support part 22b of the second lens array 22 are transferred to the lower lens member 20. Further, it is possible to prevent a positional deviation when the lens member 20 is bonded to the substrate 10. Moreover, a manufacturing step can be simplified, and a running cost can be reduced. Further, since the three-dimensional shape is transferred to the lens member 20 on both surfaces of the substrate 10 simultaneously with the bonding step, it is possible to adjust positioning of the three-dimensional shape of the lens member 20 on the both sides of the substrate 10, and accordingly of the first and second lens arrays 21 and 22, in accordance with the shaping accuracy.

Regarding the pressurization during the transfer, similarly to that during the bonding, it is desirable to change the pressure in accordance with the elastic moduli of the materials of the lens member 20 and the substrate 10. The pressure of the pressurization is, for example, 10 MPa or less, and preferably 0.05 MPa or more and 10 MPa or less. An optimum value of the pressure for pressurizing the material used varies within the above range depending on the material and the temperature, and the pressure may be lower as the material is softer. This enables transfer to the lens member 20 that is the second member, without breaking the substrate 10 that is the first member.

Further, simultaneously with the transfer, the heating step is performed in which the first and second bonding surfaces 21d, 22d, 10d, and 10e are bonded by bonding processing stronger than hydrogen bonding in the bonding step (step S15 in FIG. 4). Specifically, the heater 43 in association with the mold 40 is used to perform dehydration condensation by heating. This makes it possible to perform full fixing without applying external pressure in the heating step, which can provide higher dimensional accuracy. In the heating step, the temperature is raised more than that in the bonding step, and a bonded body of the lens member 20 and the substrate 10 is heated at a temperature higher than the glass transition temperature. In the present embodiment, the heating step is performed with the bonded body held in the mold 40. In addition, in the transfer step, after the transfer is once performed, the pressurization may be ended in the heating step. In the heating step, since the firm bonding using a dehydration condensation reaction is performed, it is not necessary to perform a process for performing physical fastening such as surface roughening, and firm bonding can be realized. A heating temperature is preferably 170° C. or higher, which is higher than the glass transition temperature. This enables firm bonding to be performed in a shorter time. The dehydration condensation reaction proceeds at 100° C. or higher, and a reaction time tends to be shorter as the temperature is higher. Note that, since a temperature at which the full fixing is completed (cannot be removed by moisture) by taking the same time as the time required for temporary fixing or temporary bonding is 170° C. or higher, complete fixing is not made in general as long as the temperature is lower than 170° C., in the above-mentioned positioning and the like. In addition, the heating step may be performed by using a heating device containing a heater.

By the full fixing in the heating step described above, the first and second lens arrays 21 and 22 and the substrate 10 are brought into a state of being completely fixed at a predetermined site with intended accuracy.

Figure 3C:
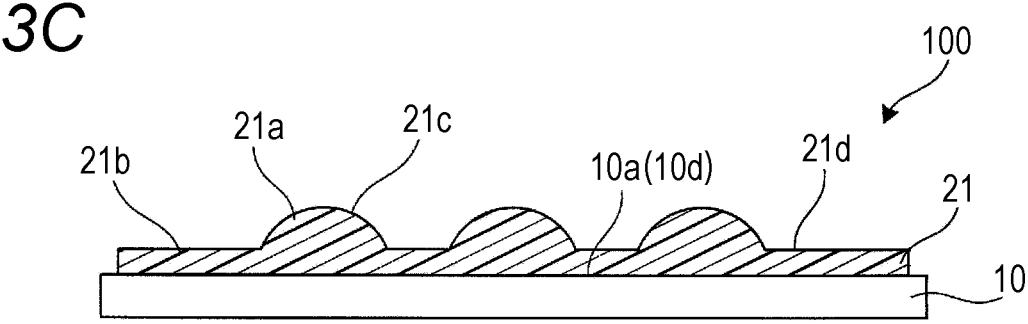
FIG. 3C is a view for explaining a modified example of the structure.

In the above, a description has been given to the method for manufacturing the structure 100 having the first and second lens arrays 21 and 22 on both surfaces of the substrate 10. By a similar method, as shown in FIG. 3C, a structure 100 having a lens array (a first lens array 21 in FIG. 3C) on only one side of the substrate 10 can be produced.

Figure 5A:
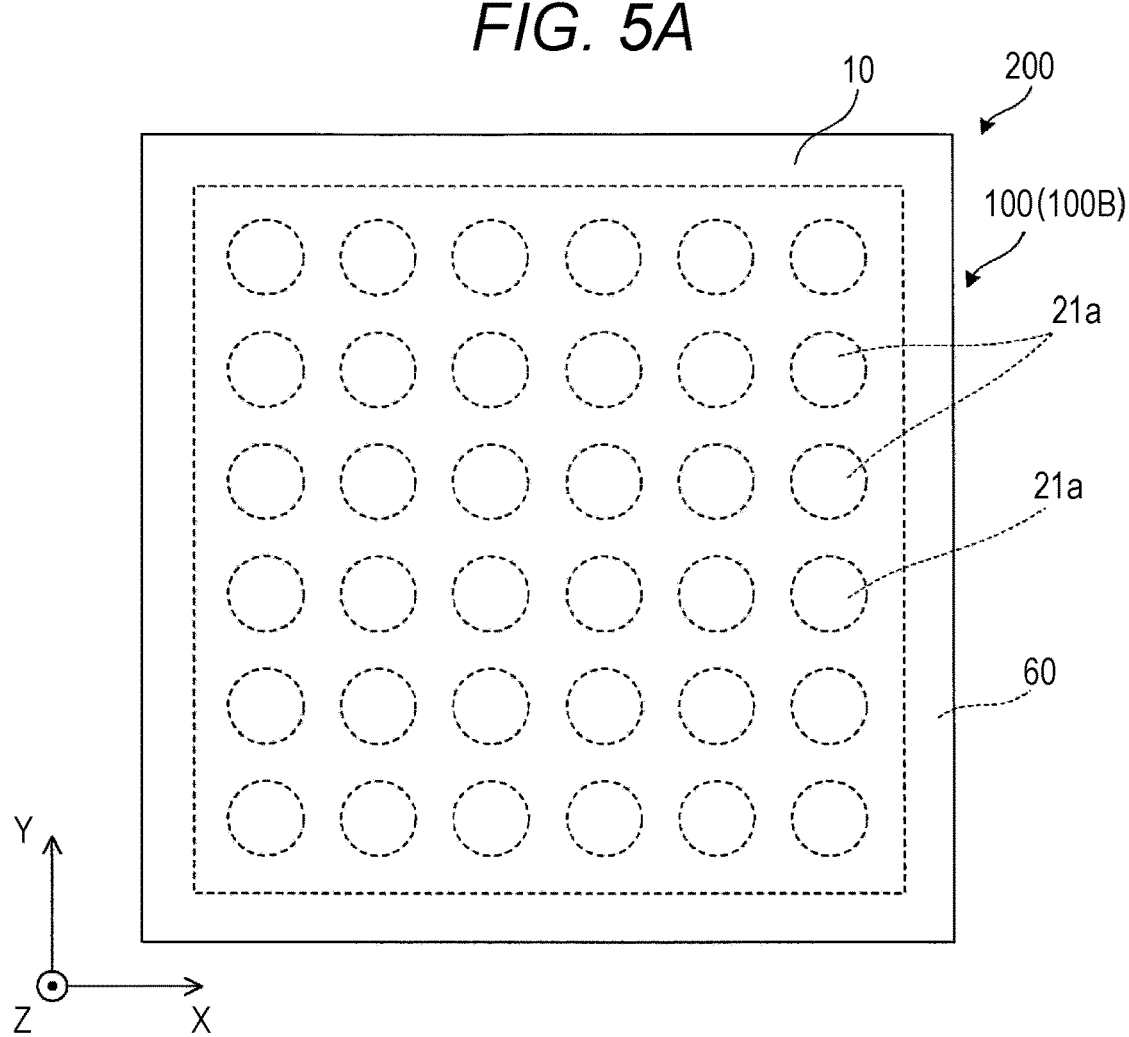
FIG. 5A is a plan view of a light source unit including the structure.
Figure 5B:
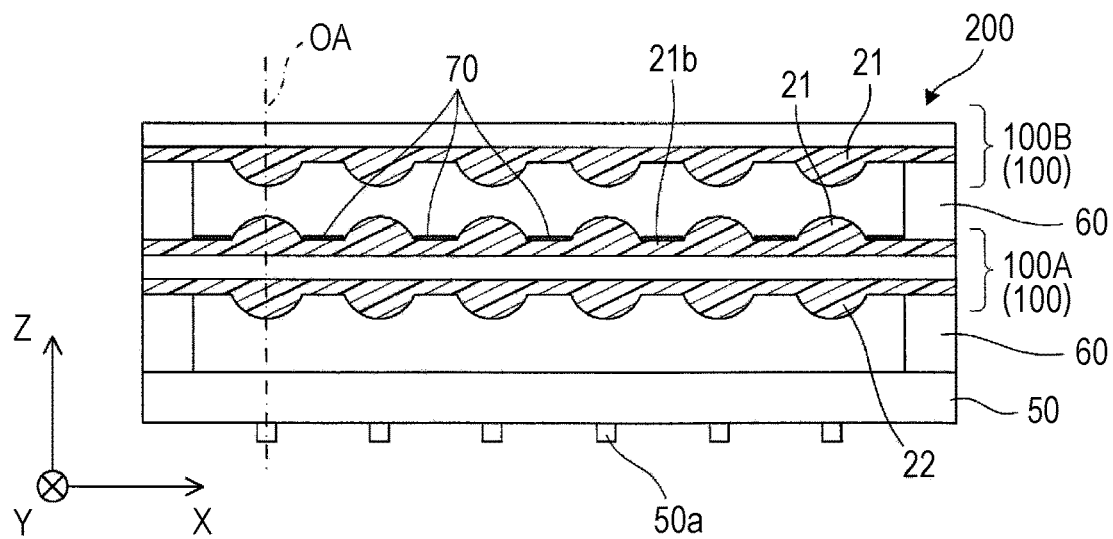
FIG. 5B is a side cross-sectional view of the light source unit shown in FIG. 5A.

Hereinafter, a usage example of the structure 100 produced by the above method will be described. As shown in FIGS. 5A and 5B, by stacking the plurality of structures 100, a lens array stack 200 can be produced. The lens array stack 200 has a light source substrate 50, a first structure 100A, and a second structure 100B. The members 50, 100A, 100B each are stacked via a spacer 60 in a Z-axis direction, that is, the optical axis OA direction. The lens array stack 200 is a light source unit that collects light of a light source 50a including a point group installed on the light source substrate 50.

The light source substrate 50 is a rectangular flat plate member, and is formed of glass. The light source substrate 50 is provided with a plurality of light sources 50a on a side opposite to a surface to which the first structure 100A is bonded. The light sources 50a are two-dimensionally arranged at positions corresponding to positions of lens elements included in the first and second structures 100A and 100B. As the light source 50a, for example, an organic EL element, LED element, or the like is used.

The first structure 100A is obtained by forming the first and second lens arrays 21 and 22 on both surfaces of the substrate 10. In the first structure 100A, a diaphragm 70 is provided in a portion of the upper first lens array 21 excluding the first lens element 21a, that is, on the first support part 21b.

The second structure 100B is obtained by forming the first lens array 21 on one surface of the substrate 10. The second structure 100B is arranged such that the first lens array 21 of the second structure 100B is opposed to the first lens array 21 of the first structure 100A.

The light source substrate 50, the first structure 100A, and the second structure 100B may be fixed by an adhesive, or may be fixed by utilizing hydrogen bonding as in the above method for manufacturing.

According to the method for manufacturing the structure described above, by directly bonding the substrate 10 that is the first member and the first and second lens arrays 21 and 22 that are the second members in the surface activation state, a linear expansion characteristic of the second member having a shape on the surface can be made equal to that of the first member, even if the first member and the second member are made of different materials. In the bonding step, since it is possible to maintain a high adhesion state while maintaining the surface activation state at a temperature that does not interfere with the surface activation state, the first and second members can be bonded more strongly without being limited by surface accuracy or a surface state of the material. Since the first member may have a simple structure such as a cylinder or a flat plate as a base material, a material that is difficult to process can be selected. In addition, the surface activation step allows both the first and second members to be bonded to each other without limitation on the materials. Further, in the bonding step, by setting the second member at a softening temperature that is a temperature equal to or higher than the reference temperature obtained by subtracting 30° C. from the load deflection temperature of the resin material, and equal to or lower than the glass transition temperature, it is possible to bond the first and second members with a lower pressure, and it is possible to relax internal stress caused by the shape of the second member, and improve the shape accuracy of the second member.

Further, by the above method, without taking measures in advance to improve adherence such as mirror finishing on the bonding surface of the member, it is possible to produce the structure 100 having firm bonding while suppressing linear expansion. By pressurizing and bonding a resin material such as a thermoplastic resin, which is relatively inexpensive and can be easily shaped into a three-dimensional shape, and one of the materials to be stacked and bonded in a temperature environment as high as possible and equal to or lower than the glass transition temperature, it is possible to bring surfaces of the respective members into close contact with each other for hydrogen bonding. In addition, in the transfer step performed simultaneously with the heating step, the heat treatment is performed while the resin has the structure in a state where a positional deviation does not occur, so that the firm bonding can be performed.

(Examples)

An example of the present embodiment will be described below. As the first member, alkali-free glass (AN100: AGC Inc.) was used. Further, as the second member, a cycloolefin polymer (COP: ZEONEX (registered trademark) E48R) was used. In the bonding step of the manufacturing step, the bonding was performed at 92 to 139° C., which is a temperature of a range from the reference temperature obtained by subtracting 30° C. from the load deflection temperature of the resin of the example to the glass transition temperature. An application pressure during the bonding was 3 MPa or less, and a pressurization time was 1 second or more and 5 minutes or less. Hereinafter, for reference, Table 1 shows results of a bonding state of the first and second members at 25° C. and 160° C. as comparative examples in the above temperature range of the present example. In evaluation of the bonding state, a symbol "○" indicates a state where natural peeling does not occur or a state where the bonding is maintained, and a symbol "x" indicates a state where natural peeling occurs or a state where the bonding cannot be maintained Here, when bonding was performed at 160° C., which is a state of exceeding 140° C. of the glass transition temperature, a surface state of the activated resin second member changed greatly, and returned to the state before activation, and the bonding was no longer performed.

TABLE 1

| Temperature at pressurization (° C.) | Bonding state |
| --- | --- |
| 25 | X |
| 92 | ○ |
| 100 | ○ |
| 130 | ○ |
| 139 | ○ |
| 160 | X |

Thereafter, the temperature of the heater was raised, and the transfer step of transferring the three-dimensional shape of the second member and the heating step were performed simultaneously with the heating step. In the transfer step, a resin temperature was set to 170° C. or higher. An application pressure during the transfer was 2 MPa or more and 10 MPa or less. A pressurization time during the transfer was 5 seconds or more. Also in the heating step, a bonded body of the first and second members was heated at 170° C. or higher, which is a temperature higher than the glass transition temperature. A structure obtained after the heating step did not separate even when immersed in water, and was firmly fixed.

Second Embodiment

A method for manufacturing a structure according to a second embodiment will be described below. Note that the method for manufacturing the structure according to the second embodiment is a partial modification of the method for manufacturing the structure according to the first embodiment, and matters not particularly described are similar to those in the first embodiment.

A method for manufacturing a structure 100 according to the second embodiment will be described with reference to FIGS. 6A to 6D, FIGS. 7A to 7C, and FIG. 8. In the present embodiment, after a bonding step, a transfer step of transferring a three-dimensional shape to a second member is performed.

[Preparation of First and Second Members]

Figure 8:
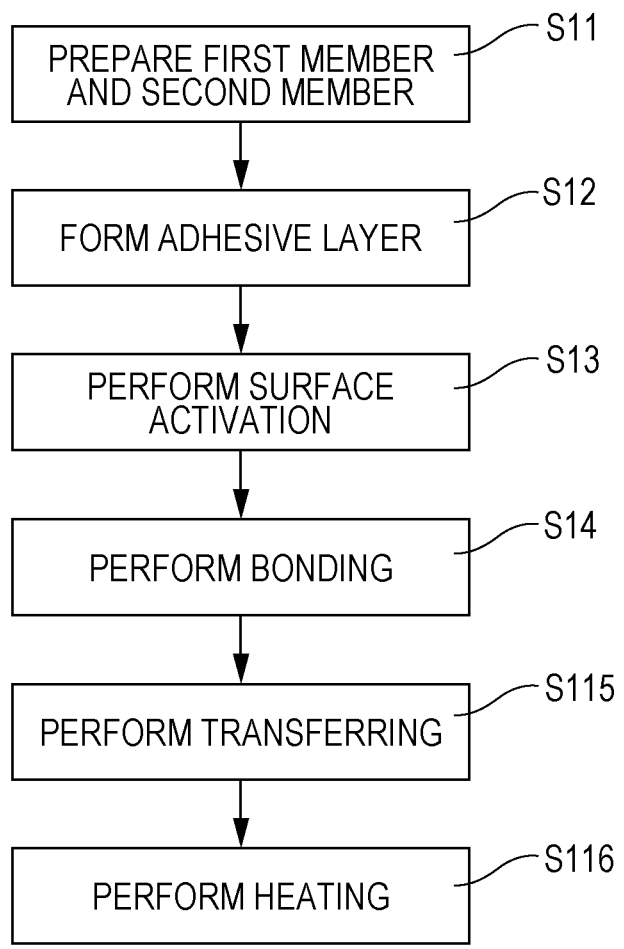
FIG. 8 is a flowchart for explaining the method for manufacturing the structure of the second embodiment.

First, a substrate 10 that is the first member, and a lens member 20 serving as a base material of first and second lens arrays 21 and 22 that are the second members are prepared (step S11 in FIG. 8).

[Formation of Adhesive Layer]

Figure 6A:
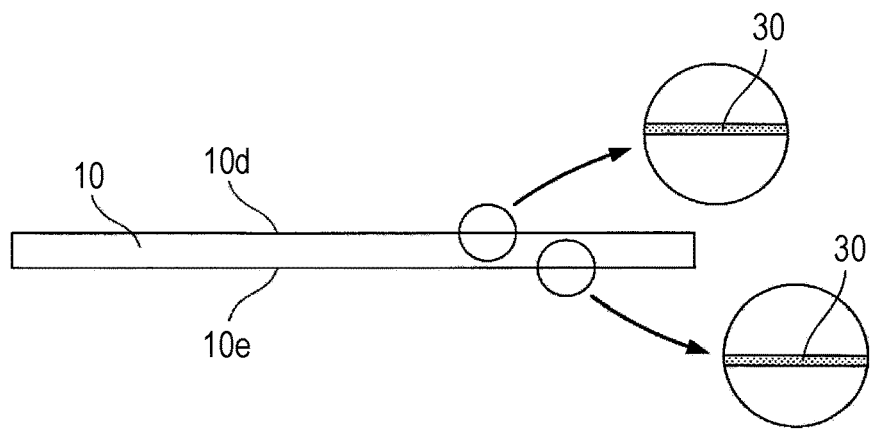
FIGS. 6A to 6D are views for explaining a method for manufacturing a structure of a second embodiment.

As shown in FIG. 6A, an adhesive layer 30 having a silane coupling agent is provided on second bonding surfaces 10d and 10e of the substrate 10 (step S12 in FIG. 8).

[Surface Activation]

Figure 6B:
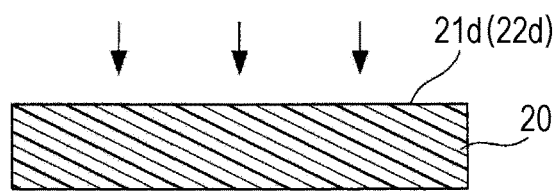
Figure 6C:
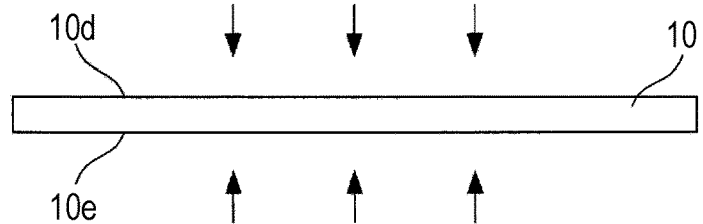

As shown in FIGS. 6B and 6C, an activation treatment is performed to cause an activation state on at least any of the first and second bonding surfaces 21d, 22d, 10d, and 10e (step S13 in FIG. 8).

[Bonding]

Next, the bonding step is performed in which the first and second bonding surfaces 21d, 22d, 10d, and 10e are pressurized while being put together, and the lens member 20 and the substrate 10 are positioned and temporarily fixed by hydrogen bonding (step S14 in FIG. 8). An environmental temperature of the bonding step is a temperature that is equal to or higher than a reference temperature obtained by subtracting 30° C. from a load deflection temperature of a resin material of the lens member 20 that is the second member, and is equal to or lower than a glass transition temperature (for example, 90° C. or higher and 140° C. or lower). In the bonding step, by pressurizing at this temperature, the lens member 20 that is the second member is closely bonded to the substrate 10 that is the first member.

First, the first bonding surface 21d on the lens member 20 side forming the first lens array 21 is made opposed to the second bonding surface 10d on the substrate 10 side, and the lens member 20 and the substrate 10 are placed at a bonding position with a gap in between, while maintaining an activated state of the surfaces of the first and second bonding surfaces 21d and 10d. Further, the first bonding surface 22d on the lens member 20 side forming the second lens array 22 is made opposed to the second bonding surface 10e on the substrate 10 side, and the lens member 20 and the substrate 10 are placed at a bonding position with a gap in between, while maintaining an activated state of the surfaces of the first and second bonding surfaces 22*d* and 10*e*.

Figure 6D:
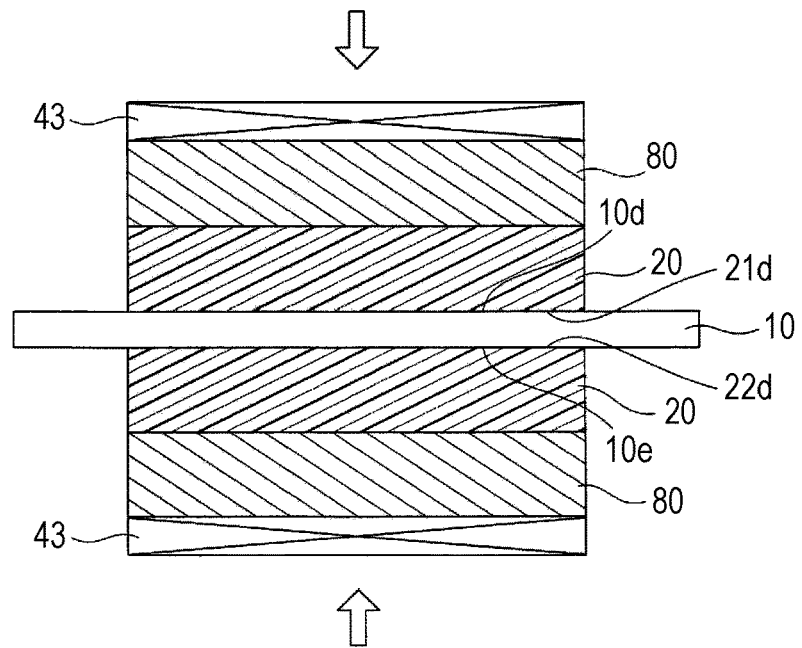

As shown in FIG. 6D, after the positioning, the lens member 20 forming the first lens array 21 and the substrate 10 are abutted and bonded to each other, with the first and second bonding surfaces 21*d* and 10*d* being activated. Further, the lens member 20 forming the second lens array 22 and the substrate 10 are abutted and bonded to each other, with the first and second bonding surfaces 22*d* and 10*e* being activated. Note that, at a time of the abutting, the first and second bonding surfaces 21*d*, 22*d*, 10*d*, and 10*e* are brought into close contact with each other by pressurizing with a predetermined pressure or more. At this time, the lens member 20 is pressed from outside by using a flat plate-shaped pressing member 80. A surface shape of the lens member 20 after the bonding step is a planar shape.

In the bonding step described above, the lens member 20 and the substrate 10 are brought into a state of being temporarily fixed by hydrogen bonding.

[Transfer]

Figure 7A:
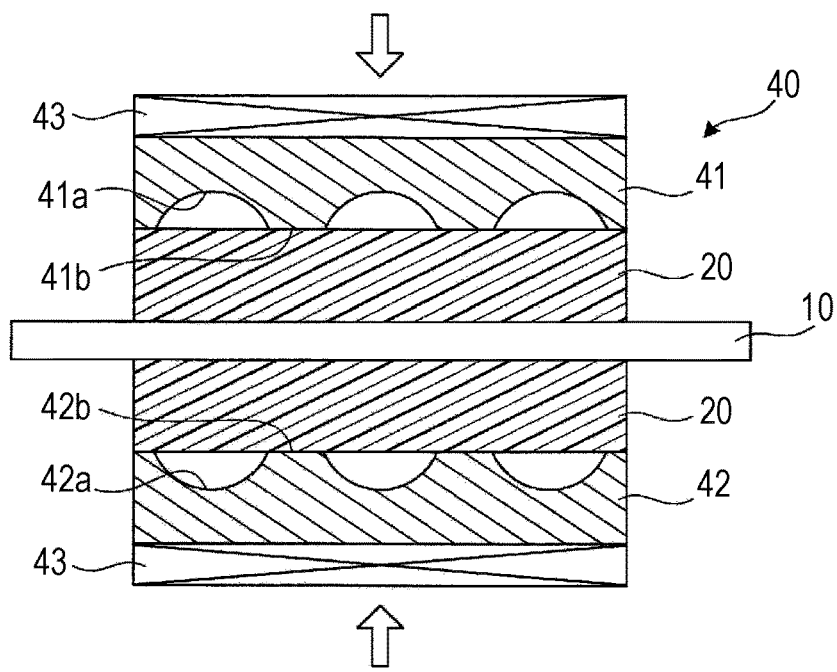
FIGS. 7A to 7C are views for explaining the method for manufacturing the structure of the second embodiment.
Figure 7B:
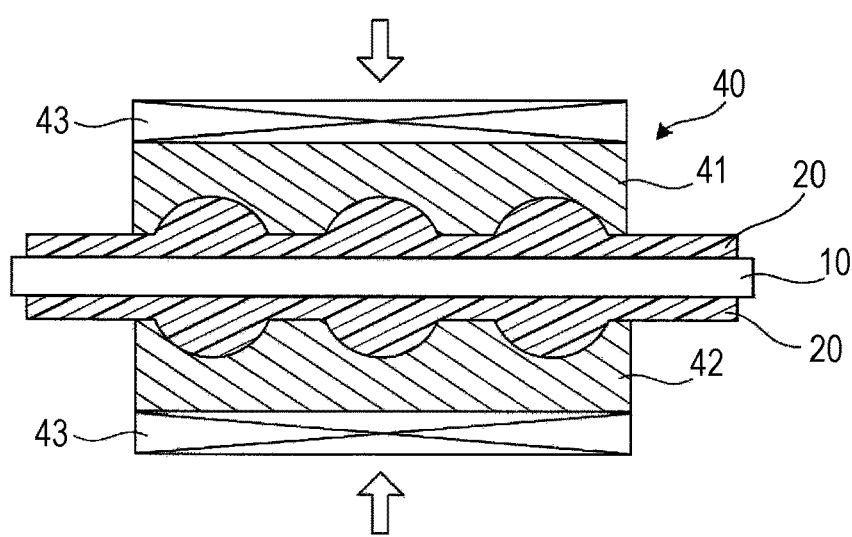
Figure 7C:
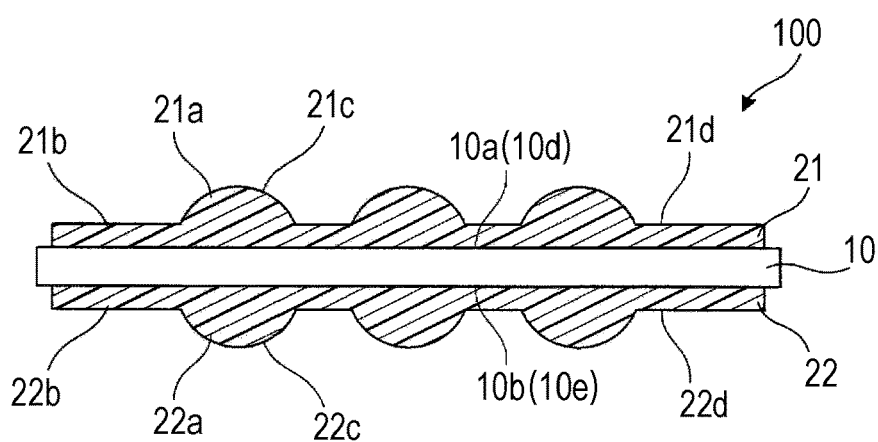

As shown in FIGS. 7A and 7B, after the bonding step above, the transfer step of transferring a three-dimensional shape to the lens member 20 that is the second member is performed (step S115 in FIG. 8). The pressing member 80 used in the bonding step is replaced with a mold 40, and the three-dimensional shape is transferred to the lens member 20. An environmental temperature of the transfer step is a temperature higher than the glass transition temperature, specifically 170° C. or higher. By the transfer step, the three-dimensional shape of the lens member 20 can be kept in a state at the time of shaping. Further, it is possible to prevent a positional deviation when the lens member 20 is bonded to the substrate 10. Further, since the three-dimensional shape is transferred to the lens member 20 on both surfaces of the substrate 10 continuously after the bonding step, it is possible to adjust positioning of the three-dimensional shape of the lens member 20 on the both sides of the substrate 10, and accordingly of the first and second lens arrays 21 and 22, in accordance with the shaping accuracy. Note that, in the above, the heating temperature is raised in the transfer step continuously after the bonding step. However, after the bonding step, a bonded body of the lens member 20 and the substrate 10 may be returned to normal temperature and then heated again in the transfer step.

[Heating]

Next, a heating step is performed in which the first and second bonding surfaces 21*d*, 22*d*, 10*d*, and 10*e* are bonded by bonding processing stronger than hydrogen bonding in the bonding step (step S116 in FIG. 8).

By the full fixing in the heating step described above, the first and second lens arrays 21 and 22 and the substrate 10 are brought into a state of being completely fixed at a predetermined site with intended accuracy. Note that the transfer step and the heating step can be performed simultaneously or continuously. Further, the transfer step can also be performed after the heating step. In addition, when the heating step is performed using a heating device, the heating may be performed with the structure 100 left in the mold 40, or may be performed after the structure 100 is released from the mold 40.

In the method for manufacturing the structure according to the second embodiment described above, the three-dimensional shape of the second member can be kept in a state at the time of shaping, by performing the transfer step after the bonding step. Further, it is possible to prevent a positional deviation of the second member with respect to the first member at the time of bonding.

(Examples)

An example of the present embodiment will be described below. As the first member, alkali-free glass (AN100: AGC Inc.) was used. Further, as the second member, a cycloolefin polymer (COP: ZEONEX (registered trademark) E48R) was used. In the bonding step of the manufacturing step, the bonding was performed at 92 to 139° C., which is a temperature of a range from the reference temperature obtained by subtracting 30° C. from the load deflection temperature of the resin to the glass transition temperature. An application pressure during the bonding was 3 MPa or less, and a pressurization time was 1 second or more and 5 minutes or less. Thereafter, the temperature of the heater was raised, a resin temperature was set to about 170° C., and the heating time was set to 350 seconds or more and 42 hours or less. No pressure was applied when the temperature was raised. After the bonding step, the transfer step of transferring the three-dimensional shape of the second member was performed. In the transfer step, a resin temperature was set to 170° C. or higher. An application pressure during the transfer was 2 MPa or more and 10 MPa or less. A pressurization time during the transfer was 5 seconds or more. Thereafter, in the heating step, a bonded body of the first and second members was heated at 170° C. or higher, which is a temperature higher than the glass transition temperature. A structure obtained after the heating step did not separate even when immersed in water, and was firmly fixed.

Third Embodiment

A method for manufacturing a structure according to a third embodiment will be described below. Note that the method for manufacturing the structure according to the third embodiment is a partial modification of the method for manufacturing the structure according to the first embodiment, and matters not particularly described are similar to those in the first embodiment.

A method for manufacturing a structure 100 according to the third embodiment will be described with reference to FIGS. 9A to 9F and FIG. 10. In the present embodiment, before a bonding step, a transfer step of transferring a three-dimensional shape to a second member is performed.

[Preparation of First and Second Members]

Figure 10:
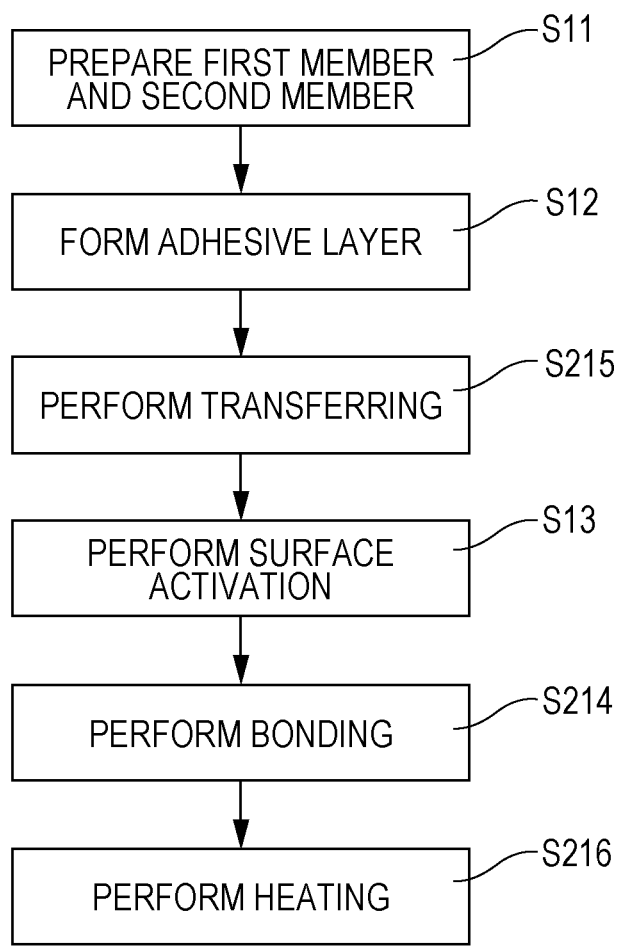
FIG. 10 is a flowchart for explaining the method for manufacturing the structure of the third embodiment.

First, a substrate 10 that is a first member, and a lens member 20 serving as a base material of first and second lens arrays 21 and 22 that are the second members are prepared (step S11 in FIG. 10). Note that, in the present embodiment, as a resin material of the first and second lens arrays 21 and 22, an energy-curable resin (an ultraviolet-curable resin, a thermosetting resin, and the like), a two-component curable resin, or the like can be used, in addition to a thermoplastic resin.

[Formation of Adhesive Layer]

Figure 9A:
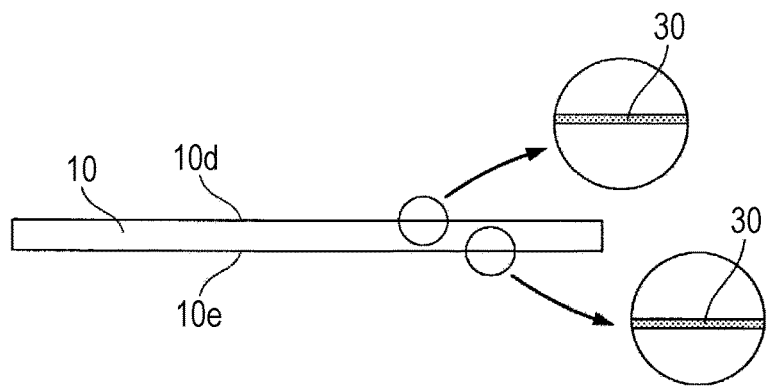
FIGS. 9A to 9F are views for explaining a method for manufacturing a structure of a third embodiment.

As shown in FIG. 9A, an adhesive layer 30 having a silane coupling agent is provided on second bonding surfaces 10*d* and 10*e* of the substrate 10 (step S12 in FIG. 10).

[Transfer]

Figure 9B:
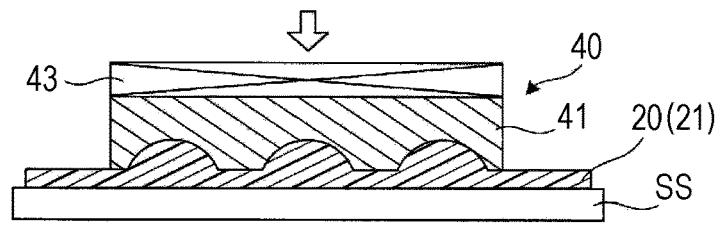

As shown in FIG. 9B, before an activation treatment step and before the bonding step, the transfer step of transferring a three-dimensional shape to the lens member 20 that is the second member is performed (step S215 in FIG. 10). The lens member 20 is placed on a support substrate SS, and the first lens array 21 is formed by pressing a mold 40 toward the support substrate SS side at a temperature higher than a glass transition temperature, specifically, under a temperature environment of 170° C. or higher. After shaping, the first lens array 21 is released from the support substrate SS and the mold 40. The second lens array 22 is also formed similarly to the first lens array 21.

[Surface Activation]

Figure 9C:
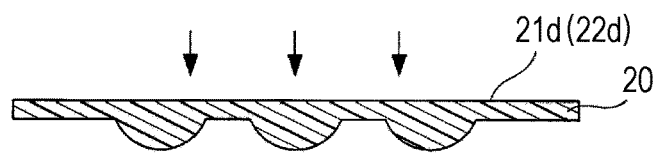
Figure 9D:
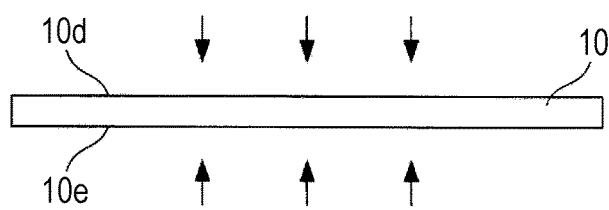

As shown in FIGS. 9C and 9D, an activation treatment is performed to cause an activation state on at least any of first and second bonding surfaces 21d, 22d, 10d, and 10e (step S13 in FIG. 10).

[Bonding]

Next, the bonding step is performed in which the first and second bonding surfaces 21d, 22d, 10d, and 10e are pressurized in a state of being put together, and the lens member 20 and the substrate 10 are positioned and temporarily fixed by hydrogen bonding (step S214 in FIG. 10). An environmental temperature of the bonding step is a temperature that is equal to or higher than a reference temperature obtained by subtracting 30° C. from a load deflection temperature of a resin material of the lens member 20 that is the second member, and is equal to or lower than a glass transition temperature (for example, 90° C. or higher and 140° C. or lower). In the bonding step, by pressurizing at this temperature, the lens member 20 is closely bonded to the substrate 10 that is the first member. The bonding step is preferably performed in a state where the first and second lens arrays 21 and 22 that are the lens members 20 maintain the shaped surfaces, for example, in a state of being respectively fitted in first and second molds 41 and 42. For example, marks are individually formed on surfaces of the molds 41 and 42, and the marks are aligned and the mold 40 is positioned and bonded.

First, the first bonding surface 21d on the lens member 20 side forming the first lens array 21 is made opposed to the second bonding surface 10d on the substrate 10 side, and the lens member 20 and the substrate 10 are placed at a bonding position with a gap in between, while maintaining an activated state of the surfaces of the first and second bonding surfaces 21d and 10d. Further, the first bonding surface 22d on the lens member 20 side forming the second lens array 22 is made opposed to the second bonding surface 10e on the substrate 10 side, and the lens member 20 and the substrate 10 are placed at a bonding position with a gap in between, while maintaining an activated state of the surfaces of the first and second bonding surfaces 22d and 10e.

Figure 9E:
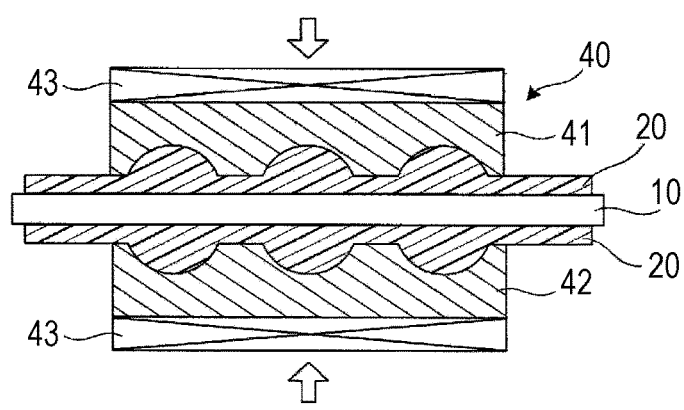
Figure 9F:
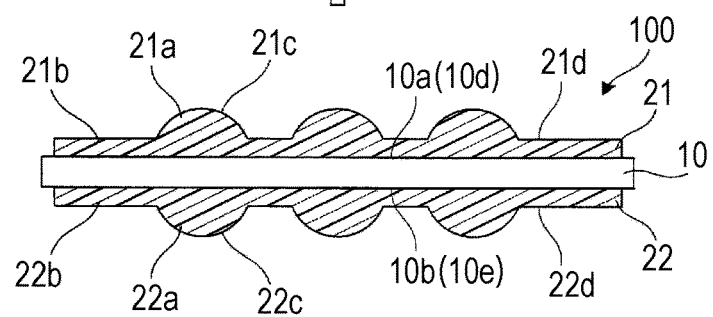

As shown in FIG. 9E, after the positioning, the lens member 20 forming the first lens array 21 and the substrate 10 are abutted and bonded to each other, with the first and second bonding surfaces 21d and 10d being activated. Further, the lens member 20 forming the second lens array 22 and the substrate 10 are abutted and bonded to each other, with the first and second bonding surfaces 22d and 10e being activated. Note that, at a time of the abutting, the first and second bonding surfaces 21d, 22d, 10d, and 10e are brought into close contact with each other by pressurizing with a predetermined pressure or more.

In the bonding step described above, the lens member 20 and the substrate 10 are brought into a state of being temporarily fixed by hydrogen bonding.

[Heating]

Next, a heating step is performed in which the first and second bonding surfaces 21d, 22d, 10d, and 10e are bonded by bonding processing stronger than hydrogen bonding in the bonding step (step S216 in FIG. 10).

By the full fixing in the heating step described above, the first and second lens arrays 21 and 22 and the substrate 10 are brought into a state of being completely fixed at a predetermined site with intended accuracy.

In the method for manufacturing the structure of the third embodiment described above, by performing the transfer step before the bonding step, it is possible to transfer the three-dimensional shape without considering breakage of the first member due to a pressurization condition at the time of the shape transfer.

Although the method for manufacturing the structure according to the present embodiment has been described above, the method for manufacturing the structure according to the present invention is not limited to the above. For example, in the above-described embodiment, shapes and sizes of the first and second lens arrays 21 and 22 (or the lens member 20) and the substrate 10 that form the structure 100 may be appropriately changed in accordance with an application and a function. For example, the lens member 20 may be formed with a convex portion or a concave portion for positioning as a shape.

Further, in the above-described embodiment, a thickness of the first and second members can be changed as appropriate, and may be thick or thin.

Further, in the above-described embodiment, the first and second members are not limited to the substrate 10 and the lens arrays 21 and 22, but can be appropriately changed in accordance with an application. The bonded body may be, for example, an electronic component, an inspection device, a semiconductor device, a micro component, and the like, in addition to the optical unit.

In addition, in the above-described embodiment, the structure 100 may be cut into individual optical elements including individual lens elements.

Further, in the above-described embodiment, the adhesive layer 30 may not be provided.

Further, in the above-described embodiment, the heating step may be omitted.

The invention claimed is:

1. A method for manufacturing a structure obtained by stacking a first member as a base material, and a second member that is opposed to the first member, the second member is formed of a resin material different from the first member, and has a shape on a surface, the method comprising:

performing an activation treatment to cause an activation state of at least one of a surface of the first member or a surface of the second member;

pressurizing the second member at an application pressure and at least at a temperature that is equal to or more than a reference temperature obtained by subtracting 30° C. from a load deflection temperature of a resin material of the second member, wherein the pressure at which the load deflection temperature is determined corresponds to the application pressure during the pressurizing, and the temperature is equal to or less than a glass transition temperature of the resin material of the second member, to closely bond the second member to the first member; and heating the structure at a temperature higher than the glass transition temperature after the pressurizing.

2. The method for manufacturing the structure according to claim 1, wherein a resin material forming the second member is a thermoplastic resin.

3. The method for manufacturing the structure according to claim 1, wherein a material forming the first member is an inorganic material.

4. The method for manufacturing the structure according to claim 1, further comprising transferring a three-dimensional shape to the second member simultaneously with the heating.

5. The method for manufacturing the structure according to claim 1, further comprising transferring a three-dimensional shape to the second member after the pressurizing.

6. The method for manufacturing the structure according to claim 1, further comprising transferring a three-dimensional shape to the second member before the pressurizing.

7. The method for manufacturing the structure according to claim 1, wherein the first member has at least two surfaces, and the second member is bonded to at least one of the two surfaces of the first member, and another second member is bonded to another of the two surfaces of the first member.

8. The method for manufacturing the structure according to claim 7, further comprising transferring a three-dimensional shape to the second member and the another second member after pressurizing.

9. The method for manufacturing the structure according to claim 1, wherein the heating is performed in an environment of 170° C. or higher.

10. The method for manufacturing the structure according to claim 4, wherein, in the transfer, pressurization is performed at a pressure of 10 MPa or less.

11. The method for manufacturing the structure according to claim 1, wherein, in the pressurizing, pressurization is performed at a pressure of 10 MPa or less.

12. The method for manufacturing the structure according to claim 1, wherein, before the performing of the activation treatment, an adhesive layer having a silane coupling agent is formed on a surface of the first member opposed to the second member.

13. The method for manufacturing the structure according to claim 1, wherein, in the performing of the activation treatment, any of an ultraviolet radiation, a plasma treatment, a corona treatment, and an ozone treatment is used to activate a surface of at least any one of the first member or the second member.

14. The method for manufacturing the structure according to claim 7, further comprising transferring a three-dimensional shape to the second member and the another second member simultaneously with the heating performed after the pressurizing.

* * * * *